United States Patent [19]

Harrison et al.

[11] 4,391,489
[45] Jul. 5, 1983

[54] LIQUID CRYSTAL MATERIALS CONTAINING PLEOCHROIC ANTHRAQUINONE DYES

[75] Inventors: Kenneth J. Harrison, Malvern Link; Edward P. Raynes, Malvern; Frances C. Saunders, Malvern Wells; David J. Thompson, Whitefield, all of England

[73] Assignee: The Secretary of State for Defence in Her Britannic Majesty's Government of the United Kingdom of Great Britain and Northern Ireland, London, England

[21] Appl. No.: 287,123

[22] Filed: Jul. 27, 1981

[30] Foreign Application Priority Data

Jul. 29, 1980 [GB] United Kingdom ............... 8024761

[51] Int. Cl.$^3$ ........................... G02F 1/13; C09K 3/34
[52] U.S. Cl. ............................. 350/349; 252/299.1; 260/378; 260/380
[58] Field of Search .................. 252/299.1; 350/349; 260/378, 380

[56] References Cited

U.S. PATENT DOCUMENTS

| | | | |
|---|---|---|---|
| 4,232,949 | 11/1980 | Huffman | 252/299.1 |
| 4,232,950 | 11/1980 | Benham | 252/299.1 |
| 4,273,929 | 6/1981 | Boller et al. | 252/299.1 |
| 4,299,720 | 11/1981 | Osman et al. | 252/299.1 |
| 4,304,683 | 12/1981 | Morinaka et al. | 252/299.1 |
| 4,360,447 | 11/1982 | Morinaka et al. | 252/299.1 |
| 4,363,743 | 12/1982 | Moeller et al. | 252/299.1 |

FOREIGN PATENT DOCUMENTS

| | | | |
|---|---|---|---|
| 2104 | 5/1979 | European Pat. Off. | 252/299.1 |
| 25809 | 4/1981 | European Pat. Off. | 252/299.1 |
| 26004 | 4/1981 | European Pat. Off. | 252/299.1 |
| 38460 | 10/1981 | European Pat. Off. | 252/299.1 |
| 44893 | 2/1982 | European Pat. Off. | 252/299.1 |
| 2920730 | 11/1979 | Fed. Rep. of Germany | 252/299.1 |
| 3009974 | 9/1980 | Fed. Rep. of Germany | 252/299.1 |
| 3028593 | 2/1981 | Fed. Rep. of Germany | 252/299.1 |
| 3036853 | 4/1981 | Fed. Rep. of Germany | 252/299.1 |
| 3038372 | 5/1981 | Fed. Rep. of Germany | 252/299.1 |
| 2037803 | 7/1980 | United Kingdom | 252/299.1 |
| 2069518 | 8/1981 | United Kingdom | 252/299.1 |
| 2082196 | 3/1982 | United Kingdom | 252/299.1 |

OTHER PUBLICATIONS

Abstracts of the Eighth International Liquid Crystal Conference, I-23 & I-24, Kyoto, Japan, (Jun. 30-Jul. 4, 1980).
Gognard, J. et al., Mol. Cryst. Liq. Cryst., vol. 70, pp. 1-19 (1981).
Saeva, F. D., Xerox Discl. J., vol. 1, Nos. 9/10, pp. 61-62 (1976).

Primary Examiner—Teddy S. Gron
Attorney, Agent, or Firm—Cushman, Darby & Cushman

[57] ABSTRACT

A material suitable for a guest-host liquid crystal device comprises a solution of a liquid crystal material and a pleochroic dye wherein the pleochroic dye comprises at least one compound having a formula:

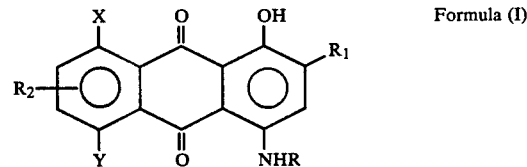

Formula (I)

wherein one of X and Y is OH and the other is NHR wherein R is H or lower alkyl; each of $R_1$ and $R_2$ independently represents alkyl, aryl, aralkyl, alkoxy or —$NR_3R_4$ wherein each of $R_3$ and $R_4$ is independently H or lower alkyl, provided that $R_2$ is always adjacent to an OH group.

25 Claims, 3 Drawing Figures

LIQUID CRYSTAL MATERIALS CONTAINING PLEOCHROIC ANTHRAQUINONE DYES

The present invention is concerned with organic materials, in particular with pleochroic dyes in solution with liquid crystal materials e.g. for electro-optic display applications.

Liquid crystal materials are well known organic materials which display phases, known as liquid crystal phases or mesophases, having a degree of molecular ordering intermediate between that of the fully ordered crystalline solid state and the fully disordered isotropic liquid state.

Electro-optical devices incorporating liquid crystal materials are well known and widely used as digital displays in such applications as watches, calculators and digital voltmeters. These devices utilise the optical contrast when an electric field is applied across a thin insulating film of suitable liquid crystal material. The molecules of the material (in a liquid crystal phase at the temperature of operation) are re-orientated by the field causing a change in an optical property of the part of the film where the field is applied, e.g. a change in ambient light scattering or transmissivity.

Liquid crystal materials have the property that their molecules can impose their ordering upon the molecules of other suitable dopant materials incorporated within them. This property is the basis of so-called "guest-host" devices e.g. display devices in which the host liquid crystal material and its guest material have one molecular configuration in the absence of an applied electric field and another molecular configuration when an electric field is applied across the material. The guest material is usually a pleochroic dye, which is a dye whose molecular absorption properties vary with the orientation of the electric vector of light incident upon its molecules. The determination of the value of the order parameter S is well understood in the art; see for example the paper "A new absorptive mode reflective liquid crystal display device" by D. L. White and G. N. Taylor in the Journal of Applied Physics, 1974, 45 pages 4718 to 4723.

For perfect orientation the order parameter S is unity (that is $\theta$ is zero). Thus, pleochroic dyes for use in guest-host devices should have an order parameter in the liquid crystal host as high as possible. However, they must also have adequate chemical, photochemical and electrochemical stability, e.g. stability when exposed to atmospheric contaminants, electric fields (as in device operation) and to ultra-violet radiation. They should not be ionic or have any ionisable character (otherwise the liquid crystal material will lose its insulating nature and conduct making the device useless). They must also have sufficient solubility in the host materials; although the concentration of guest pleochroic dye required for the desired effect is generally quite small (e.g. not more than a few percent of dye) nevertheless many pleochroic dyes are unsuitable because they are essentially insoluble in liquid crystal materials.

In UK Patent Application GB No. 2037803A (referred to herein as the 'said UK Application') liquid crystal compositions are proposed which contain as a guest phase an anthraquinone dye having the general formula:

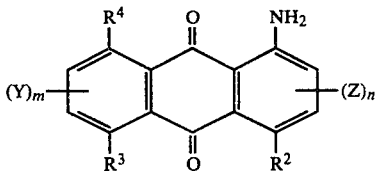

Formula (A)

in which $R^2$, $R^3$, and $R^4$ are the same or are different and each is a hydrogen atom or a hydroxyl, amino or short-chain N-monoalkylamino group; Y and Z are the same or are different and each is a halogen atom, an amino or hydroxyl group or an alkyl, alkoxy or alkylamino groups containing from 1 to 16 carbon atoms; and m and n are each 0, 1, and 2.

The use of anthraquinone dyes in liquid crystal materials had already been taught before the publication of the said UK Application, e.g. in the following patent specifications:

European Specification No. 2104A and UK Specification No. 1,482,542.

It is suggested in the said UK Application that the reason why dyes of Formula (A) are proposed for use in liquid crystal compositions is that these dyes are commercially available. However, although Formula (A) embraces numerous dyes belonging to many different classes only a few specific compounds having Formula (A) are in fact commercially available. Five of these compounds are listed in Table I in the said UK Application.

Although these commercially available compounds show adequate photostability and reasonable order parameter in host material we have found that they generally show insufficient solubility in host material for practical purposes giving somewhat weak colour effects. Therefore, it could be concluded that dyes of Formula (A) have little practical usefulness in liquid crystal materials.

Surprisingly, we have now found that dyes of a particular class of anthraquinones which falls partially within the scope of Formula (A) show markedly improved solubility compared with the specific commercially available dyes mentioned in the said UK Application and are consequently useful in liquid crystal materials for practical guest-host applications.

According to the present invention in a first aspect a material suitable for a guest-host liquid crystal device comprises a solution of a liquid crystal material and a pleochroic dye wherein the pleochroic dye comprises at least one compound having a formula:

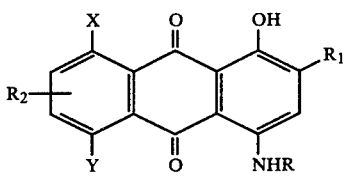

Formula (I)

wherein one of X and Y is OH and the other is NHR wherein R is H or lower alkyl; each of $R_1$ and $R_2$ independently represents alkyl, aryl, aralkyl, alkoxy or $-NR_3R_4$ wherein each of $R_3$ and $R_4$ is independently H or lower alkyl provided that $R_2$ is always adjacent to an OH group.

$R_1$ and $R_2$ may be the same or different. Preferred examples of $R_1$ and $R_2$ are $C_1$ to $C_{10}$ alkyl, phenyl and substituted phenyl, benzyl and lower alkoxy. Substituents for the phenyl group may be alkyl, alkoxy, alkanoyl, halo, —OH or —NR$_3$R$_4$. Preferred alkyl radicals for R$_1$ and R$_2$ are CH$_2$Q where Q is C$_1$ to C$_9$, α-branched alkyl, optionally substituted with phenyl, lower alkoxy or lower alkanoyl. By a 'lower' alkyl, alkoxy or alkanoyl group is meant a group having four or less carbon atoms.

Within the general class of compounds represented by Formula (I), particular mention may be made of compounds of the formula:

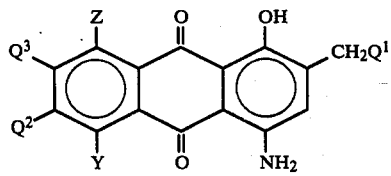

Formula (II)

wherein Q$^1$ represents an alkyl radical containing from 3 to 9 carbon atoms, one of Y and Z is OH and the other is NH$_2$ and one of Q$^2$ and Q$^3$ is H and the other is a —CH$_2$Q$^1$ radical, the one that is *ortho* to the OH group being the —CH$_2$Q$^1$ radical. Preferably at least one of the two —CH$_2$Q$^1$ radicals is of the form

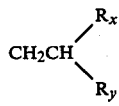

where R$_x$ and R$_y$ are alkyl groups; preferably at least one of the —CH$_2$Q$^1$ radicals is isobutyl.

Thus, Formula (II) embraces the sub-classes represented by Formula (III) and (IV) as follows:

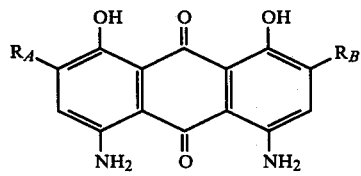

Formula (III)

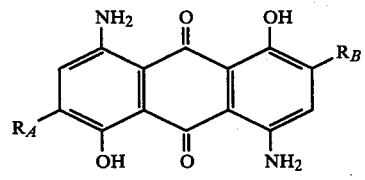

Formula (IV)

wherein each of R$_A$ and R$_B$ is independently an alkyl group of the form —CH$_2$Q$^1$ where Q$^1$=alkyl as defined above.

Preferably, although not necessarily, one or both of R$_A$ and R$_B$ is of the form

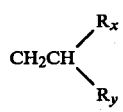

where R$_x$ and R$_y$ are both alkyl, e.g. R$_A$ and R$_B$ are preferably both isobutyl, since this facilitates production of the compounds as described below.

Particularly useful examples of compounds of Formulae (III) an (IV) include 4,5-diamino-2,7-di-isobutyl-1,8-dihydroxyanthraquinone (R$_A$ and R$_B$ in Formula (III)=isobutyl), 4,8-diamino-2,6-di-isobutyl-1,5-dihydroxyanthraquinone (R$_A$ and R$_B$ in Formula IV)=isobutyl) and 4,5-diamino-2,7-dionyl-1,8-dihydroxyanthraquinone (R$_A$ and R$_B$ in Formula (III) =n—C$_9$H$_{19}$).

As noted above, compounds of Formula (I), particularly the three specific compounds mentioned above, show improved solubility in liquid crystal material (as exemplified below). This, together with the higher order parameters and good stability shown by these compounds in the host material make the dyes of Formula (I) more attractive than the commercially available materials of Formula (A) mentioned in UK Patent Application GB No. 2037803A for liquid crystal guest-host applications.

The dyes of Formula (I) are also more attractive than the dyes disclosed in European Patent Specification No. 2104A and in UK Patent Specification No. 1,482,542 because of the higher order parameters they show. The dyes of Formula (I) also absorb at longer wavelengths than the blue dyes of the said European Specification.

The liquid crystal material (host material) in which the dye of Formula (I) is dissolved in the first aspect above is not critical since a dye which shows reasonable solubility in one liquid crystal material is likely to show reasonable solubility in other liquid crystal materials and also a dye which gives an improved order parameter in one liquid crystal material is likely to give an improved order parameter in other liquid crystal materials, as most popular liquid crystal materials have a similar rod-like molecular shape; however, the order parameter of any dye will vary to a limited extent from host-to-host.

Suitable host materials include nematic materials, e.g. composed mainly of 4-alkyl or alkoxy-1-(4'-cyanophenyl)-4'-alkylcyclohexane compounds, optionally doped with a chiral material to form a long pitch cholesteric material, depending on the device application as explained further below. Examples of host materials include:

a. mixtures incorporating cyanobiphenyls preferably together with a few percent of a compound having a clearing point (liquid crystal to isotropic liquid transition) above 150° C. (e.g. a cyano-p-terphenyl) such as the material E7 or E43;

b. mixtures incorporating cyanophenyl cyclohexane compounds preferably together also with a few percent of a high clearing point compound such as a cyanobiphenyl cyclohexane compound, e.g. the material ZLI 1132;

c. mixtures incorporating at least one cyanobiphenyl and at least one cyanophenylpyrimidine, preferably together also with a few percent of a high clearing point compound, e.g. a cyanophenylpyrimidinephenyl compound, e.g. the material RO TN 430;

d. mixtures incorporating esters, e.g. containing bicyclo (2,2,2) octane, cyclohexane and benzene rings;

e. any other liquid crystal material incorporating one or more compounds selected from the following known families;

(R = alkyl)
 i
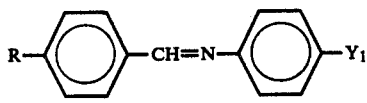 xiv
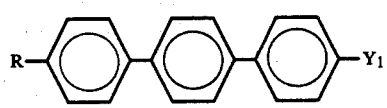 ii
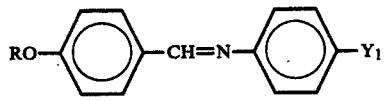 xv
 iii
 xvi  $-Y_1; m = 1,2$
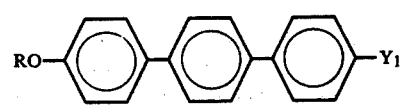 iv
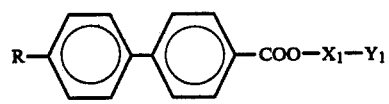 xvii
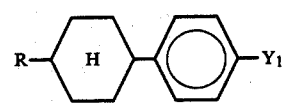 v
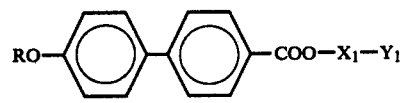 xviii
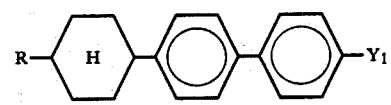 vi
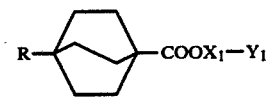 xix
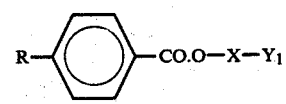 vii
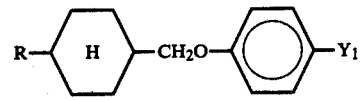 xx
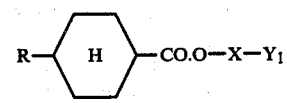 viii
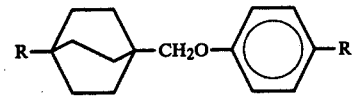 xxi
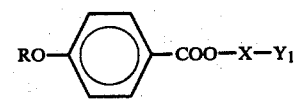 ix
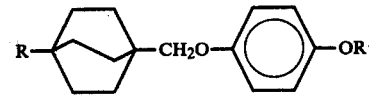 xxii
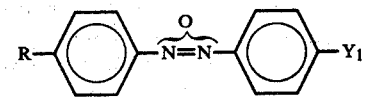 x
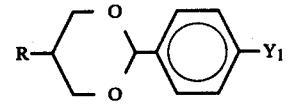 xxiii
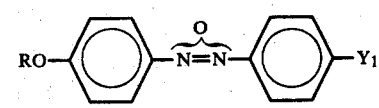 xi
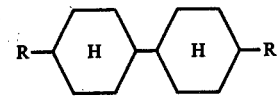 xxiv
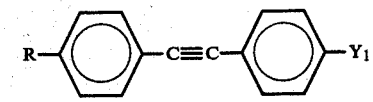 xii
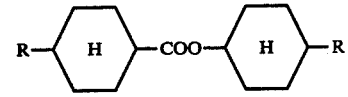 xxv
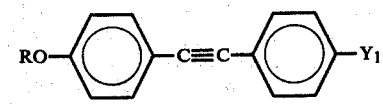 xiii
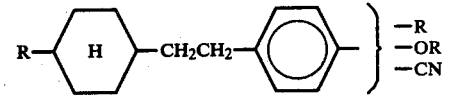 xxvi or any of these structures having benzene rings containing substituents, e.g. fluorine, in their benzene rings, where

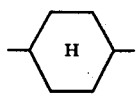

is a trans, 1,4 substituted cyclohexane ring,

is a 1,4 substituted bicyclo (2.2.2) octane ring, $X_1$ is a 1,4 phenylene group

a trans 1,4 di substituted cyclohexane ring

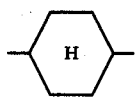

or a 4.4' biphenylyl group

or a 2,6 naphthyl group

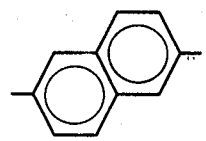

and Y is CN, or $R^1$, or $OR^1$ or $CO.O-X_1-Y^1$ where $Y^1$ is CN, or $R^1$ or $OR^1$; the definition of $R^1$ being the same as that of R.

Preferably, the dye/liquid crystal solution contains at least 0.5% by weight of the dye and preferably between about 0.7% and 5.0% by weight of the dye or more.

Solutions of dye and liquid crystal material may be made in a conventional way simply by mixing the dye and the liquid crystal material together and then heating the mixture at about 80° C. with stirring for about 10 minutes and then allowing the mixture to cool.

Pleochroic dyes of Formula (I) above may be mixed together with other dyes (which may or may not also be of Formula (I)), e.g. to extend their spectral absorption properties (when dissolved in liquid crystal material). For example, where a dye of Formula (I) is blue it may be mixed with a yellow dye and a red dye. The relative proportions of the dyes mixed together are determined by the desired spectral response as determined by the extinction coefficients of the constituent dye compounds. The dye mixture is then used with liquid crystal material as above or in one of the ways described below:

Yellow and red dyes suitable for use with dyes of Formula (I) when blue are those described in our co-pending UK Patent Application No. 8024797, and Applications claiming priority from that Application, which are compounds which may be represented by the Formula:

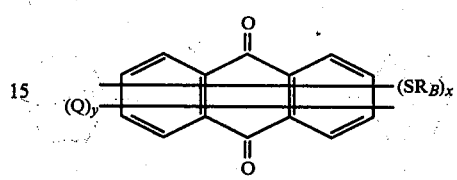

Formula (V)

where $R_B$ is aryl or alkyl. Q is halogen, hydroxy, amine, alkylamine, dialkylamino, nitro, alkyl or aryl, x is an integer of from 1 to 4 and y is an integer of from 0 to 4.

In particular either or both of the yellow and red dyes may include compounds having a Formula:

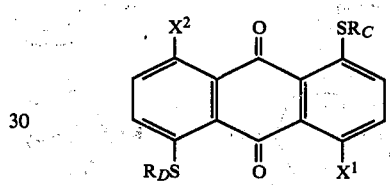

Formula (VI)

wherein $R_C$ and $R_D$ *are groups selected from phenyl and* 4-alkylphenyl groups and $S^1$ and $X^2$ are either both hydrogen (for yellow dyes) or are selected from thiophenyl or 4-substituted thiophenyl groups, preferably 4-alkyl thiophenyl - ie thiophenyl substituted in the para position relative to the link with the anthraquinone nucleus - (for red dyes).

According to the present invention in a second aspect a liquid crystal electro-optical display includes two electrically insulating substrates at least one of which is optically transparent, electrodes on the inner surfaces of the substrates and a film of dielectric material contained between the electrodes and the substrates, wherein the dielectric material is material according to the first aspect of the invention as defined above.

The liquid crystal/dye solution which is the material according to the first aspect of the invention may be used in any known electro-optical display as defined in the second aspect. Examples, which will be familiar to those skilled in the liquid crystal art, are the known devices operating by the following effects:

a. THE TWISTED NEMATIC EFFECT

In this case a film of nematic liquid crystal material of positive dielectric anisotropy has an off state in which (the long axes of) its molecules lie in the plane of the device substrate inner surfaces (which are normally parallel to one another), or at a small angle thereto, and undergo roughly a $\pi/2$ helical twist in orientation from one substrate to the other by virtue of the orientations at the surfaces caused by treatment, eg unidirectional rubbing, of those surfaces prior to assembly. This is the twisted "homogeneous texture". Application of an electric field between the electrodes on the respective substrate inner surfaces to give the on state causes rearrangement of the liquid crystal molecules to lie (with and sodium dithionite (65 parts) and the temperature is raised to 50° C. Iso-butyraldehyde (35.6 parts) is then added and the temperature is raised to 70°–80° C. over 2 hours and maintained for a further 18 hours. The reactive mixture is cooled and the solid is filtered off, washed in turn with water (250 parts), 3% hydrochloric acid (250 parts) and finally water until acid-free (500 parts) and dried in an air oven giving 51.5 parts of product. One crystallisation from ethyl acetate (or glacial acetic acid) gives yellow needles of 2,7-di-isobutyl-1,8-dihydroxyanthraquinone, mp 138°–140° C.

20% Oleum (230 parts) is added to concentrated sulphuric acid (180 parts) followed by boric acid (30 parts), the temperature rising to about 70° C. The mixture is stirred at 60°–70° C. for 30 minutes to dissolve the solid and cooled to 50° C. 2,7-i-isobutyl-1,8-dihydroxyanthraquinone (60 parts) is then added portionwise and after 1 hour at 20°–30° C., 100 parts of a 25/75 mixture of concentrated nitric acid and concentrated sulphuric acid are added. The reaction mixture is stirred at room temperature for 2 hours and then drowned into water. The solid is collected, washed with water until acid-free and dried in an air oven giving 66.5 parts of product. Crystallisation from dioxen gives 2,7-di-isobutyl-1,8-dihydroxy-4,5-dinitroanthraquinone, mp 250°–252° C.

A slurry of the above dinitro compound (40 parts) in water (600 parts) is treated with sodium sulphide crystals (80 parts) and the mixture is stirred at 90° C. for 3–4 hours. The reaction mixture is filtered and the collected solid is well washed with water and dried in an air oven giving 31 parts of 4,5-diamin, 2,7-di-isobutyl-1,8-dihydroxyanthraquinone. Two crystallisations from isopropanol give black needles, mp 198°–200° C. Two further crystallisations from toluene give black needles, mp 200–201 C. of 98–99% purity by HPLC.

EXAMPLE 2

The procedure of Example 1 is followed using 1,5-dihydroxyanthraquinone is place of the 1,8-isomer. The initially formed 2,6-di-isobutyl-1,5-dihydroxyanthraquinone (mp 188° C.) after nitration and reduction gives 4,8-diamino-2,6-isobutyl-1,5-dihydroxyanthraquinone, mp 286° ∝ 288° C.

EXAMPLE 3

The procedure of Example 1 is followed using 59 parts of nonaldehyde in place of the 356 parts of isobutyraldehyde.

EXAMPLE 4

The process described in Example 1 of UK Patent Specification No. 1152244 is repeated to give a product consisting substantially of 1,5-dihydroxy-4,8-diamino-2 (4'-hydroxyphenyl)-6-hydroxymethylanthraquinone. This product is extracted with toluene for 16 hours, cooled and allowed to stand for 4 hours before filtration and drying at 80° C.

Examples of dyes having Formula (I) above and their properties are given below. In the properties the following symbols are used:
λmax = wavelength of maximum absorption
S = order parameter (measured at 20° C.)
and the following liquid crystal host materials are referred to:
 i. Host A, which is the BDH material E7 which includes the following compounds:

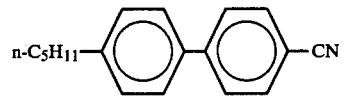
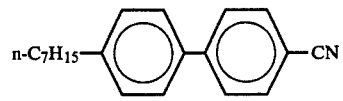
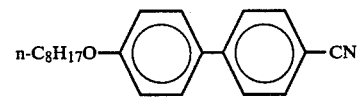
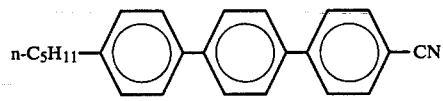

ii. Host B, which is the BDH material E43 which includes the following compounds:

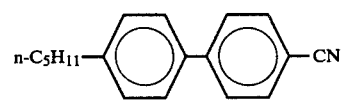
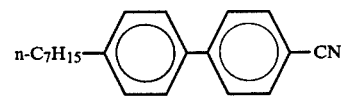
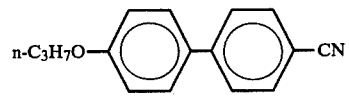
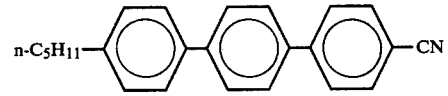
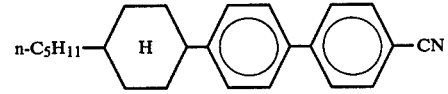

iii. Host C, which is the E Merck material ZLI1132, which includes the following compounds:

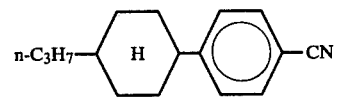
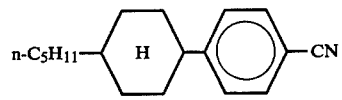
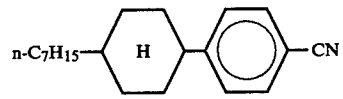

their long axes) effectively perpendicular to the substrate inner surfaces in the "homeotropic texture". A change in optical activity (rotary power) of the film occurs between the on and off states by virtue of the molecular re-arrangement and the optical effect observed can be enhanced by the use of a linear polariser adjacent to one of the substrates and pleochroic dye dissolved in the liquid crystal material. The polariser has its polarisation axis parallel to the direction of the liquid crystal molecules at the adjacent substrate inner surface (or, more strictly, parallel to the average axis of projection of the molecules on that surface). By the guest-host effect the dye causes the off state to appear relatively dark or strongly colour whereas the on state appears clear or weakly coloured.

b. THE FREEDERICKSZ EFFECT IN NEGATIVE NEMATICS

In this case a film of nematic liquid crystal material of negative dielectric anistropy has an off state in which its molecules lie perpendicular (ie in the homeotropic texture) to the substrate inner surfaces (which are parallel) by virtue of surface treatments to these inner surfaces prior to assembly. A single polariser is placed adjacent to one substrate with its transmission axis perpendicular to the normal to the inner surfaces. Application of an electric field between the electrodes on the respective substrate inner surfaces to give the on state causes re-arrangement of the liquid crystal molecules to lie parallel to the substrate inner surfaces (ie in the homogeneous texture). Incorporation of pleochroic dye in the liquid crystal material ensures that the off state appears relatively clear or weakly coloured whereas the on state appears dark or strongly coloured. The effect observed is enhanced by the presence of the polariser.

c. THE FREEDERICKSZ EFFECT IN POSITIVE NEMATICS

In this case a nematic liquid crystal material of positive dielectric anistropy has an off state in which the molecules lie roughly parallel and in the plane of the substrate inner surfaces (which are parallel) by virtue of treatment of those surfaces prior to assembly (ie the homogeneous texture). A single polariser is placed adjacent to one substrate with its transmission axis parallel to the substrate inner surfaces.

Application of an electric field between the electrodes on the respective substrate inner surfaces to give the on state causes re-arrangement of the liquid crystal molecules to lie perpendicular to the substrate inner surfaces, ie the homeotropic texture. Incorporation of pleochroic dye in the liquid crystal material ensures that the off state appears relatively dark or strongly coloured whereas the on state appears colourless or weakly coloured as in the twisted nematic effect above. The effect observed is enhanced by the presence of the polariser.

d. THE PHASE CHANGE EFFECT (NEGATIVE CONTRAST TYPE)

In this case a cholesteric liquid crystal material of positive dielectric anisotropy and long molecular helical pitch, typically 3 μm, has an off state in which its molecules lie in random helices, ie the "focal conic texture". Application of an electric field between the electrodes on the respective substrate inner surfaces to give the on state causes re-arrangement of the liquid crystal molecules to lie perpendicular to the substrate inner surfaces (ie the homeotropic texture as for positive nematics in the Freedericksz effect). Incorporation of pleochroic dye in the liquid crystal material gives an off state which appears relatively dark or strongly coloured and an on state which appears colourless or weakly coloured.

e. THE PHASE CHANGE EFFECT (POSITIVE CONTRAST TYPE)

In this case a cholesteric liquid crystal material of negative dielectric anisotropy and long molecular helical pitch has on off state in which its molecules lie perpendicular to the substrate inner surfaces, ie in the homeotropic texture. Application of an electric field between the electrodes on the respective substrate inner surfaces causes re-orientation of the molecules to lie in the plane of the substrate inner surfaces in a helical arrangement ie the twisted homogeneous texture. Incorporation of pleochroic dye in the liquid crystal material gives an off state which is relatively colourless or weakly coloured and an on state which is relatively dark or strongly coloured.

As described in copending UK application No. 2038809A the anthraquinone dyes of Formula (I) may be prepared using synthetic methods conventionally employed for the preparation of anthraquinone compounds. Thus, compounds of Formula (II) may be prepared from compounds of the formula:

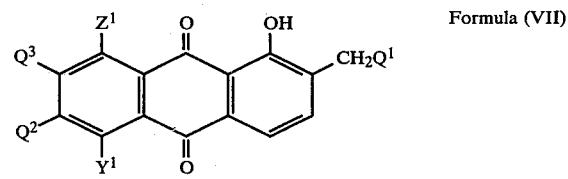

Formula (VII)

wherein one of $Y^1$ and $Z^1$ is OH and the other is H, $Q^1$, $Q^2$ and $Q^3$ having the meanings given above, by nitration to the corresponding dinitro compound followed by reduction of the nitro groups using standard methods.

The compounds of Formula (VII) may themselves be prepared by reacting an anthraquinone compound of the formula:

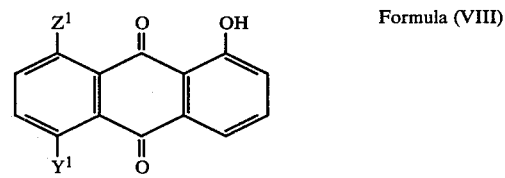

Formula (VIII)

with an aliphatic aldehyde ($Q^1$CHO) in the presence of aqueous alkaline sodium dithionite. It has been found that iso-butyraldehyde is particularly suitable for this process because this aldehyde adds on efficiently to the structure of Formula (VIII).

For the purposes of the present invention, the anthraquinone compounds of Formula (I) should be of extremely high purity (as will be clear to those skilled in the liquid crystal art). Purification may be effected using conventional methods such as recrystallisation from suitable solvents and chromatography.

Examples of the preparation and properties of anthraquinone compounds of Formula (I) will now be given.

EXAMPLE 1

1,8-Dihydroxyanthraquinone (36 parts) is added to water (500 parts) with stirring under nitrogen at room temperature followed by sodium hydroxide (36 parts)

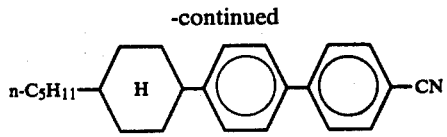

iv. Host D, which is the material RO TN 430 which includes the following compounds:

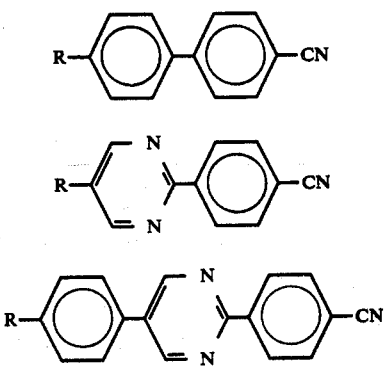

v. Host E, which has a composition:

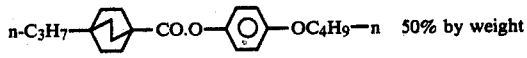  50% by weight

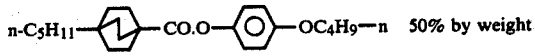  50% by weight

It may be noted that a material of negative dielectric anisotropy may be made simply by adding a small quantity eg 10% by weight of a 'negative' dopant, eg the compound

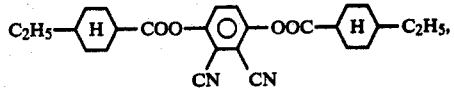

to Host E which has a small negative dielectric anisotropy.

1 DYE No 1
Structure:

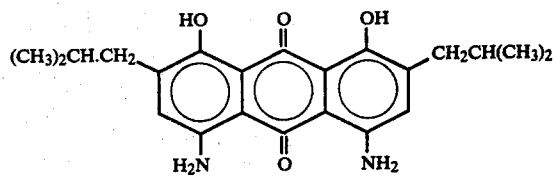

This is 4,5-diamino-2,7-di-isobutyl-1,8-dihydroxyanthraquinone prepared as in Example 1 above.

TABLE 1

| PROPERTIES OF DYE No 1 IN VARIOUS HOSTS | | |
|---|---|---|
| HOST | λ max (nm) | S |
| A | 596,640 | 0.68 |
| B | 596,640 | 0.73 |
| C | 596,640 | 0.73 |
| D | 596,640 | 0.70 |

TABLE 1-continued

| PROPERTIES OF DYE No 1 IN VARIOUS HOSTS | | |
|---|---|---|
| HOST | λ max (nm) | S |
| E | 595,637 | 0.65 |

Dye No 1 showed no change in S or λ max (in Host A) after 500 hour exposure to ultra-violet radiation at 365 nm.

2: DYE No 2
Structure:

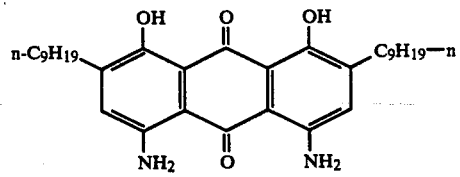

This is 4,5-diamino-2,7-dinonyl-1,8-dihydroxyanthraquinone prepared as in Example 3 above.

TABLE 2

| PROPERTIES OF DYE No 2 IN VARIOUS HOSTS | | |
|---|---|---|
| HOST | max (nm) | S |
| A | 592,636 | 0.69 |
| B | 592,636 | 0.74 |
| C | 594,636 | 0.75 |

3: DYE No 3
Structure:

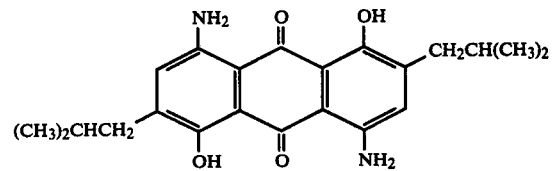

This is 4,8-diamino-2,6-di-isobutyl-1,5-dihydroxyanthraquinone prepared as in Example 2 above.

TABLE 3

| PROPERTIES OF DYE No 3 IN VARIOUS HOSTS | | |
|---|---|---|
| HOST | max (nm) | S |
| A | 582,627 | 0.69 |
| B | 582,627 | 0.74 |
| C | 582,627 | 0.75 |

4: Dye No 4
Structure

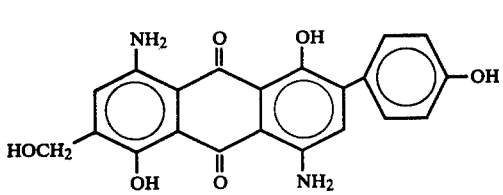

This is 1,5-dihydroxy-4,8-diamino-2(4'-hydroxyphenyl)-6-hydroxymethyl-anthroquinone prepared as in Example 4.

Order parameter (S) in Host B is 0.72. Solubility in Host B is >2% by weight at 20° C.

Comparative solubility and order parameter tests were made on Dye Nos. 1, 2 and 3 and on the five commercially available dyes listed in UK Patent application No. 2,037,803A by determining the maximum solubility and order parameter of each compound in turn in Host B defined above at 20° C. The results are given in Tables 4 and 5 as follows:

TABLE 4

Prior art dye compounds considered (all of Formula (A) above):

| Dye No | $R^2$ | $R^3$ | $R^4$ | Y | Z | m | n |
|---|---|---|---|---|---|---|---|
| PA 2 | H | —NH$_2$ | H | — | — | 0 | 0 |
| PA 3 | —OH | —NH$_2$ | —OH | — | — | 0 | 0 |
| PA 4 | —OH | —OH | —NH$_2$ | — | — | 0 | 0 |
| PA 5 | —NH$_2$ | —NH$_2$ | —NH$_2$ | — | — | 0 | 0 |
| PA 6 | —OH | —NH$_2$ | —OH | Br | Br | 0 | 1 |

TABLE 5

SOLUBILITY AND ORDER PARAMETER OF DYES IN HOST B

| Dye No | Solubility in Host B | Order Parameter in Host B |
|---|---|---|
| PA 2 | 0.5 | 0.7 |
| PA 3 | <0.1 | |
| PA 4 | 0.5 | 0.7 |
| PA 5 | 0.5 | 0.69 |
| PA 6 | 1.0 | 0.55 |
| 1 | 1.8 | 0.73 |
| 2 | 3.5 | 0.74 |
| 3 | 1.0 | 0.73 |

Table 5 illustrates an improved combination of solubility and order parameter for Dyes 1, 2 and 3 compared with that for dyes PA 2 to PA 6 in a typical host material.

The following further properties have been measured for Dye No. 1 and are given in Tables 6 to 8 as follows:

TABLE 6

| Molar extinction coefficient (CHCl$_3$) | $2 \times 10^4$ |
|---|---|

TABLE 7

Fading under exposure to ultra violet (u.v.) radiation (time for absorbance to fall to 90% of its initial value)

| a. | Under "black" light (u.v., 20° C.) | 2,000 hours |
|---|---|---|
| b. | Under Xenon arc light (u.v. + visible, 40° C.) | 500 hours |

These figures illustrate the good stability of the dyes.

TABLE 8

Further properties of Dye No 1 in various other host materials

| Host Material (clearing point in brackets) | | Properties of Dye No. 1 in host Solubility | |
|---|---|---|---|
| | | S | (%) |
| ZLI 1695 | (72°) | 0.81 | 2.0 |
| BCO | (92° C.) | 0.80 | — |
| PDX | (87° C.) | 0.70 | — |
| ZLI 1565 | (85° C.) | 0.63 | 2.3 |
| ZLI 1624 | (87° C.) | 0.60 | 2.9 |
| RO TN 403 | (82° C.) | 0.66 | — |

BCO is a three component mixture consisting of

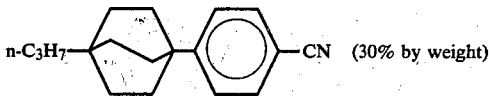

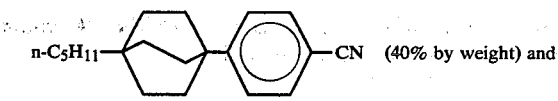

E7 and E43 are commercially available from BDH Chemicals Limited, Broom Road, Poole, England.

ZLI 1132, ZLI 1695, ZLI 1565 and ZLI 1624 are commercially available from E Merck Co., Darmstadt, German Federal Republic.

RO TN 403 and RO TN 430 are commercially available from F Hoffman La Roche Co, Basle, Switzerland.

PDX is a mixture of 1-(4'-cyanophenyl)-4-alkyl-2,6-dioxan compounds.

Examples of liquid crystal devices embodying the second aspect of the present invention will now be described with reference to the accompanying drawings in which.

Figure 1:
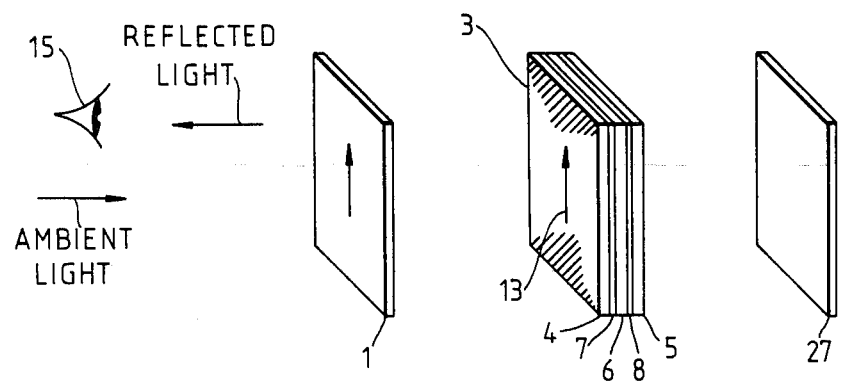
FIG. 1 is an exploded view of a Freedericksz effect display device embodying the present invention.
Figure 2:
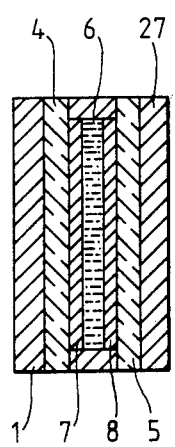
FIG. 2 is a sectional view of the device shown in FIG. 1.
Figure 3:
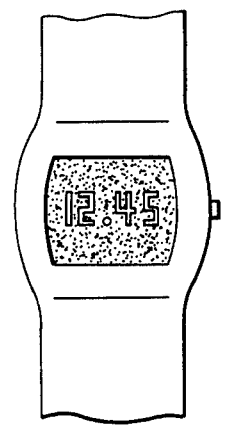

FIG. 3 is a front view of a watch having a liquid crystal display constructed as shown in FIGS. 1 and 2, As shown in FIG. 1 a liquid crystal display of the Freedericksz effect (positive nematic) type includes a liquid crystal cell 3 comprising two glass slides 4, 5 containing a layer of liquid crystal material 6 which is basically a positive nematic mayerial together with a pleochroic dye. Electrodes 7, 8 eg of tin oxide are arranged on the inner faces of the slides 4, 5. A brushed aluminium reflector 27 may be located behind the slide 5.

As shown in FIG. 1 a liquid crystal display of the Freedericksz effect (positive nematic) type includes a liquid crystal cell 3 comprising two glass slides 4, 5 containing a layer of liquid crystal material 6 which is basically a positive nematic material with a pleochroic dye. Electrodes 7, 8 eg of tin oxide are arranged on the inner faces of the slides 4, 5. A brushed aluminium reflector 27 may be located behind the slide 5.

Prior to assembling the cell 3 the slides 4, 5 are coated on their inner faces with silicon monoxide or magnesium fluoride. This coating is formed by evaporating a stream of eg silicon monoxide onto the slide at an angle of about 30° to the surface as for example described in UK Patent Specification No. 1,454,296. On assembly the slides are arranged with the evaporation direction on the two slides 4, 5 parallel to one another. With such coatings applied liquid crystal molecules at the coated surfaces lie in a single direction (orthogonal to the evaporation direction) and parallel to the adjacent slide surface. As a result the liquid crystal molecules lie in a parallel homogeneous texture as indicated by arrow 13 (FIG. 1). The dye molecules in guest-host relationship with the liquid crystal molecules are also roughly in this texture giving a relatively strongly coloured appearance.

A single polariser 1, placed in front of, or behind, the cell 3 (shown in FIG. 1 in front of the cell 3) with its transmission axis parallel to the alignment direction of the liquid crystal material 6, will enhance the colour of the display. By this arrangement, the electric vector of the incident or reflected light is confined roughly parallel to the transition moment of the dye molecule.

When a suitable voltage, eg a few volts, is applied between the electrodes 7 and 8, ie to give the on state, the molecules of the liquid crystal material are switched to the homeotropic texture, ie to lie parallel to the electric field along an axis perpendicular to the slides 4, 5. The dye molecules are also switched to this texture by the guest-host effect and have their long axes essentially parallel (ie they are essentially "end-on") to light incident on the cell 3 in a direction perpendicular to the slides 4, 5, effectively reducing their absorption of ambient light. This gives the cell 3 a relatively clear or weakly coloured appearance.

If the electrodes 7 and 8 cover only part of the inner surface of the slides 4 and 5 respectively the entire cell 3 will appear strongly coloured in the off state (with no applied voltage) whereas in the on state only the region of the liquid crystal material 6 between the electrodes 7, 8 will appear clear or weakly coloured in the on state (with a voltage applied) the remainder of the cell 3 appearing strongly coloured, ie remaining in the off state.

Thus, by shaping the electrodes, 7, 8 into discrete facing parts, eg bars of a digit separately connectable to a voltage source (not shown) symbols or letters may be displayed. This may be achieved by photoetching (in a known way) the layers, eg $SnO_2$, used to form the electrodes 7, 8 prior to assembly.

For example, in the watch display of FIG. 3 the electrodes 7, 8 are shaped to provide four seven bar numeric digits to display time; eg the digits are displaying 12.45 as shown in FIG. 3. A pulsed period dot P is also included, as in conventional watch displays, to indicate operation of the display.

Examples of suitable dyed liquid crystal material for the material 6 above is Dye No. 1, Dye No. 2 or Dye No. 3 (structure given above) in the host material, A, B, C or D (composition given above).

Dyes Nos. 1, 2 or 3 may alternatively be used together with liquid crystal material in any other known guest-host liquid crystal device, eg any one of the devices described above, constructed in a known manner.

An example of a dye mixture incorporating a dye compound having Formula (I) above together with other pleochroic dyes for use in any guest-host effect device, eg any of those described above, such as that illustrated in FIGS. 1 to 3, is as follows:

| Dye Mixture 1 | | |
| --- | --- | --- |
| Dye No 1 | (structure given above) (blue) | 1.0 part by weight |
| Dye No 4 | (yellow) | 2.4 part by weight |
| Dye No 5 | (red/purple) | 1.4 part by weight | where Dye No. 4 has the structure (as disclosed in our copending UK Patent application No. 8024797;

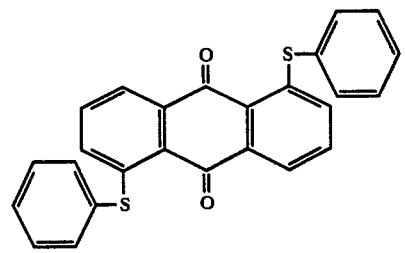

and Dye No. 5 (as disclosed in European Patent Specification No. 2104A) has the structure:

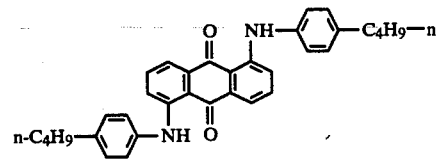

Dye Mixture 1 may be used for example in Host A or B defined above in which case the parts by weight figures for the individual dye compounds are percentage by weight figures for the dye/liquid crystal solution.

A graph of absorbance v wavelength for this solution indicated that the dye mixture is neutral grey in colour.

A further dye mixture which may be used in the liquid crystal material 6 of the device described with reference to FIG. 1 to 3 or in any other known known guest-host effect device is as follows:

| Dye Mixture 2 | |
| --- | --- |
| Dye No 1 | 0.8 part by weight |
| Dye No 4 | 2.0 part by weight |
| Dye No 6 | 1.0 part by weight | where Dye Nos. 1 and 4 are as above and Dye No. 6 has a structure:

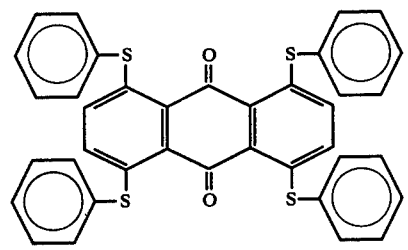

(as disclosed in our copending UK Patent application No. 8024797).

In an alternative device embodying the second aspect of the present invention a cholesteric to nematic phase change effect is made in a known way. The method of construction is the same as that described above with reference to FIGS. 1 to 3 except that no $MgF_2$ or SiO coating need be applied to the inner surfaces of the electrode bearing slides 4, 5, no polariser 1 is required and the liquid crystal material 6 in this case is essentially a long pitch cholesteric material (having a molecular helical pitch of the order of about 3 μm containing a pleochroic dye. A suitable material is one of the two hosts Host A and B defined above doped with chiral material (eg as explained below) and containing the Dye Mixture 1 or 2 defined above (as used in the specific Freedericksz effect device described with reference to FIGS. 1 to 3) (the thickness of the material 6 layer again being 6 to 12 μm).

In the "off" state (with no voltage applied) the cell 3 again appears strongly coloured in this case (as in the Freedericksz effect device). The liquid crystal material 6 in this state is in the focal conic texture which comprises an arrangement of random molecular helices. The dye molecules take up the same arrangement by the guest-host effect. The strong colouration (which may be black or dark grey) is because ambient white light incident on the material 6 via the slide 4 is partially absorbed by the dye molecules which are perpendicular or oblique to the light propagation direction.

In the "on" state a voltage (typically 10-15 volts) is applied between the electrodes 7, 8 sufficient to give the homeotropic texture, ie with the liquid crystal molecules between the electrodes 7, 8 essentially re-orientated to lie perpendicular to the slides 4, 5. The dye molecules between the electrodes 7, 8 are re-orientated to this arrangement by the guest-host effect. The region between the electrodes 7, 8 appears clear or weakly coloured in this state (as with the Freedericksz effect device) because the dye molecules are essentially "end-on" to ambient light propagating in a direction perpendicular to the cell 3, ie perpendicular to the slides 4, 5 (via the slide 4).

A suitable chiral dopant material in this case is the compound CB 15 supplied by BDH Chemicals Limited which is

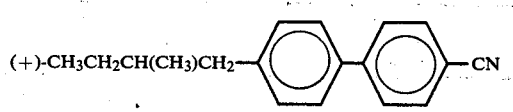

This may be added to Host A or B in the proportions of 5% by weight of CB 15 to 95% by weight of Host A or B.

I claim:

1. A material suitable for a guest-host liquid crystal device comprising a solution of a liquid crystal material and a pleochroic dye wherein the pleochroic dye comprises at least one compound having a formula:

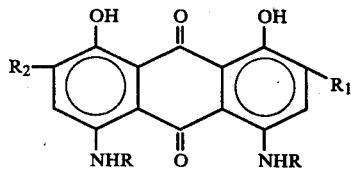

wherein R is H or lower alkyl; and each of $R_1$ and $R_2$ independently represents alkyl containing between 1 and 10 carbon atoms.

2. A material as claimed in claim 1 in which $R_1$ and $R_2$ are independently alkyl groups containing between 4 and 10 carbon atoms.

3. A material as claimed in claim 1 in which each of $R_1$ and $R_2$ is independently a group

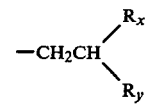

where $R_x$ and $R_y$ are alkyl groups.

4. A material as claimed in claim 1 in which the compound is 4,5-diamino-2,7-di-isobutyl-1,8-dihydroxyanthraquinone, the groups $R_1$ and $R_2$ both isobutyl groups.

5. A material as claimed in claim 1 in which the compound is 4,5-diamino-2,7-dinonyl-1,8-dihydroxyanthraquinone, the groups $R_1$ and $R_2$ being n-$C_9H_{19}$ groups.

6. A material as claimed in claim 1 in which the liquid crystal material includes one or more cyanobiphenyl liquid crystal compounds.

7. A material as claimed in claim 6 in which the liquid crystal material is composed mainly, as a percentage by weight, of cyanobiphenyl compounds.

8. A material as claimed in claim 1 in which the liquid crystal material includes one or more cyanophenylcyclohexane liquid crystal compounds.

9. A liquid crystal material as claimed in claim 8 in which the liquid crystal material is composed mainly, as a percentage by weight, of cyanophenylcyclohexane compounds.

10. A material as claimed in claim 1 in which the liquid crystal material is a nematic material suitable for a Freedericksz effect or twisted nematic effect device.

11. A material as claimed in claim 1 in which the liquid crystal material is a long pitch cholesteric material suitable for a cholesteric-to-nematic phase change liquid crystal material formed of a mixture of a nematic material and a chiral material.

12. A material as claimed in claim 11 in which the nematic material is composed mainly, as a percentage by weight, of cyanobiphenyl compounds.

13. A material as claimed in claim 12 in which the chiral material is 4-[(+)-2-methylbutyl]-4'-cyanobiphenyl and forms less than 10% by weight of the mixture of nematic and chiral materials.

14. A material as claimed in claim 13 in which the nematic material is a material composed mainly of cyanobiphenyl compounds and the chiral material 4-(+)-2-methylbutyl-4'-cyanobiphenyl forms about 5% by weight of the mixture of nematic and chiral materials.

15. A material as claimed in claim 1 in which the pleochroic dye comprises a mixture of dyes of different color, at least one comprising a compound having Formula (I) as defined in claim 33.

16. A material as claimed in claim 15 in which the compound having Formula (I) is a blue dye compound.

17. A material as claimed in claim 16 in which the blue dye compound is selected from:
4,5-diamino-2,7-di-isobutyl-1,8-dihydroxyanthraquinone,
and
4,5-diamino-2,7-dinonyl-1,8-dihydroxyanthraquinone.

18. A material as claimed in claim 15 in which the dye compound having Formula (I) is mixed together with a yellow dye and a red dye.

19. A material as claimed in claim 18 in which at least one of the yellow dye and red dye has a formula:

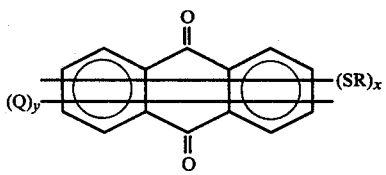

Formula (V)

wherein R is aryl or alkyl, Q is halogen, hydroxy, anino, alkylamino, dialkylamine, nitro, alkyl, or aryl, x is an integer of from 1 to 4 inclusive, and y is an integer of from 0 to 4 inclusive.

20. A material as claimed in claim 19 in which at least one of the yellow dye and the red dye comprises a compound having a formula:

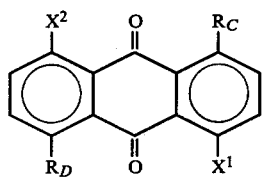

Formula (VI)

wherein $R_C$ and $R_D$ are groups selected from thiophenyl and 4-alkylthiophenyl groups and $X^1$ and $X^2$ are either both hydrogen or are groups selected from thiophenyl and 4-alkylthiophenyl groups.

21. A material as claimed in claim 20 in which the yellow dye comprises a dye compound of Formula (VI) as defined in claim 20, $X^1$ and $X^2$ being hydrogen, and the red dye comprises a dye compound of Formula (VI) as defined in claim 20, $X^1$ and $X^2$ being groups selected from thiophenyl and 4-alkylthiophenyl.

22. A material as claimed in claim 21 in which the blue dye comprises a compound selected from:
   4,5-diamino-2,7-di-isobutyl-1,8-dihydroxyanthraquinone,
and
   4,5-diamino-2,7-dinonyl-1,8-dihydroxyanthraquinone.

23. A liquid crystal electro-optical device comprising two electrically insulating substrates at least one of which is optically transparent, electrodes on the inner surfaces of the substrates and a film of dielectric material contained between the electrodes and the substrates, wherein the improvement comprises the dielectric material being material as claimed in claim 1.

24. A device as claimed in claim 23 in which the device is a Freedericksz effect or twisted nematic effect device.

25. A device as claimed in claim 23 in which the device is a cholesteric to nematic phase change effect device, the dielectric material being a long pitch cholesteric material.

* * * * *